May 6, 1952

E. S. RUSSELL 2,595,299

DISK SLIDE RULE

Filed Dec. 19, 1947

2 SHEETS—SHEET 1

Inventor
BY Emory S. Russell
Popp and Popp
attorneys.

INVENTOR.
Emory S. Russell
BY
Popp and Popp
Attorneys.

Patented May 6, 1952 2,595,299

UNITED STATES PATENT OFFICE 2,595,299

DISK SLIDE RULE

Emory S. Russell, Kenmore, N. Y.

Application December 19, 1947, Serial No. 792,714

5 Claims. (Cl. 235—84)

This invention relates to a disk slide rule and more particularly to an indicator made of cardboard or similar sheet material, such as plastic, and comprising a body or rear sheet member with one or more rotary sheets, concentric or otherwise, mounted on the body sheet and capable of being rotated relative to the body sheet and to one another. Such rotary disk slide rules have a wide variety of uses, for example, in supplying information concerning different uses or different varities of a product where one rotary sheet can be provided with a pointer or cut-out to expose successive portions of informative matter printed on the body sheet or on another rotary sheet; or as a disk slide rule where the rotary sheets and body sheet can be provided with cooperating pointers and calculated scales to permit of rapidly calculating particular problems.

The principal object of the present invention is to provide a simple and inexpensive disk slide rule having one disk arranged in advance of a rotary disk or sheet and held stationary with reference to a rear body or backing sheet so that calculations can be readily made from scales or pointers imprinted on the stationary disk and rotary disk.

Another principal object is to provide a simple and inexpensive disk slide rule having a plurality of rotary sheets in which the setting of one rotary sheet does not move and hence affect the setting of another rotary sheet, thereby to permit of rapidly setting successive rotary sheets and of obtaining an accurate answer. The accidental shifting of one rotary sheet in setting another rotary sheet, of course, results in an erroneous answer.

Another object is to provide a disk slide rule in which the body sheet and rotary sheets can be made of low-cost cardboard or sheet plastic and in which adequate bearing surfaces are provided so that the indicator will stand up under conditions of severe and constant use without getting out of order and without danger of the rotary sheets cutting themselves free to an extent which will interfere with the operation or accuracy of the indicator.

Another object is to provide such a disk slide rule composed of relatively rotatable slidingly interfitted pieces of cardboard or sheet plastic in which there is a minimum frictional resistance to the rotation of the rotary sheets relative to one another and to the body sheet and which are easily and quickly brought into proper assembled relation with one another.

Another object is to provide such a disk slide rule in which any desired number of independently adjustable rotary sheets can be provided and in which the rotary sheets can be arranged eccentrically to render the rotary sheets more conveniently accessible for manipulation.

Another aim is to provide such a disk slide rule in which, by the generally concentric arrangement of two or more rotary sheets, the overall dimensions of the indicator can be reduced and the masking effect of the outermost rotary sheet can be applied over the full diameter of the face which it covers and not merely one radial side thereof.

Another purpose is to provide such a disk slide rule, the paper or cardboard parts of which can be made on commercial paper forming machinery, thereby to permit of large scale production of the indicator at very low cost.

Another object is to provide such a disk slide rule in which there is no danger of accidental derangement of the rotary sheet or sheets.

Other objects and advantages will appear from the following description and drawings in which Fig. 1 is a top plan view of one form of disk slide rule embodying the present invention, and showing the same in the form of a calculator for calculating retail selling prices from different costs and with different mark-ups. Only that portion of the circular scales necessary to an explanation of the use of the calculator is shown.

Figures 1, 2, 3:
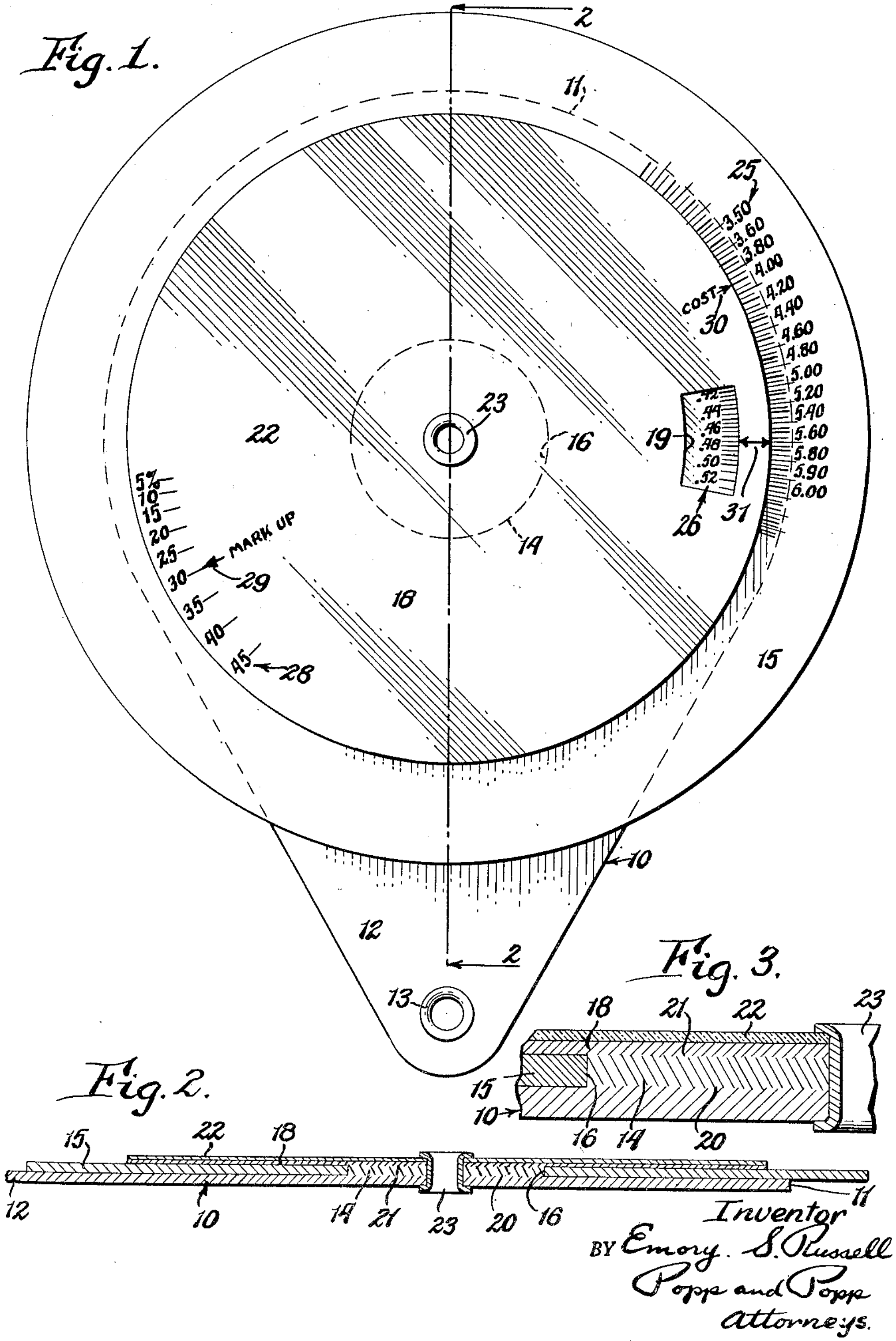
Fig. 2 is a fragmentary sectional view taken on line 2—2, Fig. 1, the thickness of the stationary sheets, spacers and rotary sheets being exaggerated for clarity.
Fig. 3 is a fragmentary view similar to Fig. 2 on an enlarged scale.

The form of disk slide rule illustrated in Figs. 1–3 is shown as including a body or rear sheet member 10 of flat cardboard and which is generally pear-shaped in form, this body or backing sheet having a circular edge 11 and having a tab or finger piece 12 projecting outwardly from one side to provide a holder by means of which the indicator can be conveniently grasped. This projection 12 can be provided with a grommet or eyelet 13 which permits of hanging the indicator on a wall.

A circular spacer 14 of relatively small diameter is arranged against a part of the forward face of the body or backing sheet 10 and preferably concentric with its circular edge 11. A ring-shaped or rotary sheet or disk 15 of flat cardboard or sheet plastic material is also arranged against the forward face of the body or backing sheet 10 and is provided with a concentric circular opening 16 which closely fits the periphery of the circular spacer 14, the bearing for the rotation of the rotary sheet 15 being provided by the periphery of the circular spacer 14.

A second sheet or disk 18 is arranged against the forward face of the circular spacer 14 and rotary sheet 15. This disk is shown as having a window 19 cut therein.

A feature of the invention resides in connecting the body sheet 10, the circular spacer 14 and the disk or sheet 18 so that they are held in fixed relation to one another. While this could be accomplished by means of glue, staples or like fastenings, I prefer to accomplish this connection by making the circular spacer 14 of a thermoplastic material and by welding the forward and rearward faces of this thermoplastic spacer to the disk or sheet 18 and body or backing sheet 10, respectively, by the application of heat. As indicated, the body sheet 10 and the disk or sheet 18 are preferably made of low-cost cardboard and the weld, effected by the application of heat, between the circular spacer 14 and the body sheet 10 is indicated at 20, and the weld similarly provided between the circular spacer 14 and the disk 18 is indicated at 21.

For the illustrated use of the disk slide rule shown in Figs. 1–3, it is essential to have a second rotary sheet or disk, indicated at 22. While this rotary sheet can be in the form of a simple pointer or strip, it is shown as being in the form of a transparent plastic disk 22 and held in concentric relation with the first rotary sheet 15 by means of a metal eyelet or grommet 23. This eyelet or grommet 23 extends through the rotary sheet 22, second sheet or disk 18, circular spacer 14 and body sheet 10 and is shown as arranged concentric with all of these parts. The rear end of this grommet or eyelet is upset to provide an enlarged head arranged against the rearward face of the body sheet 10 and the forward end of this eyelet or grommet is upset to provide an enlarged head arranged against the front face of the rotary sheet 22, the rotary sheet 22 being capable of rotation relative to the disk 18 on the reduced shank of this eyelet or grommet.

As an example of a practical application of the rotary indicator shown in Figs. 1–3 as a calculator, it is shown as provided with scales and markings which permit a retailer to rapidly compute his selling price of articles of different costs and at different mark-ups, a mark-up being the percentage of increase in the retailer's price with reference to his cost. For this purpose, a circular scale 25 of prices is imprinted on the rotary sheet 15 immediately beyond and concentric with the periphery of the disk 18, only a portion of this scale being illustrated, and this scale being calibrated in progressively increasing amounts and representing the cost per dozen of the various articles which he sells. A second circular scale 26 is also imprinted upon the rotary sheet 15 inside of the first scale 25 and concentric therewith and in position to be exposed through the window 19 of the disk 18. This scale 26 is identical with the scale 25 except that it is calibrated in the cost per unit rather than in the cost per dozen, as with the scale 25. A third scale 28 is imprinted on the front face of the disk 18 near its periphery and arranged concentric with its axis. This scale is calibrated in progressive increments of percentage of mark-up. The rotary sheet 22 is provided with a pointer or indicator 29 arranged to traverse the scale 28 and is preferably labeled "mark-up" and the rotary sheet 22 is provided on its opposite side with a second pointer 30 which is preferably labeled "cost." The answer is read from a pointer 31 imprinted on the forward face of the disk 18 alongside the window 19, this pointer jointly traversing the scales 25 and 26 and indicating the selling price in either units or dozen lots of any particular article with a predetermined cost and a predetermined mark-up.

In the use of the calculator, assuming that the retailer, for the goods being calculated, has a mark-up of 30% and assuming that the cost of the goods was $4.00 per dozen, the operation of the calculator would be as follows: The retailer would first turn the rotary disk 22 so as to bring the "mark-up" pointer 29 in register with the 30% line of the scale 28. He would then turn the rotary disk 15 so as to bring the calibration "$4.00" on the scale 25 into register with the "Cost" arrow 30. Upon then noting the arrow 31 he would observe that his retail selling price would be approximately $5.70 per dozen at this cost and mark-up. At the same time, by reference to the scale 26 and the calibration thereof appearing in the window 19 opposite the pointer 31, the retailer knows that the individual units so purchased should be priced at about 47½¢.

Figures 4, 5, 6:
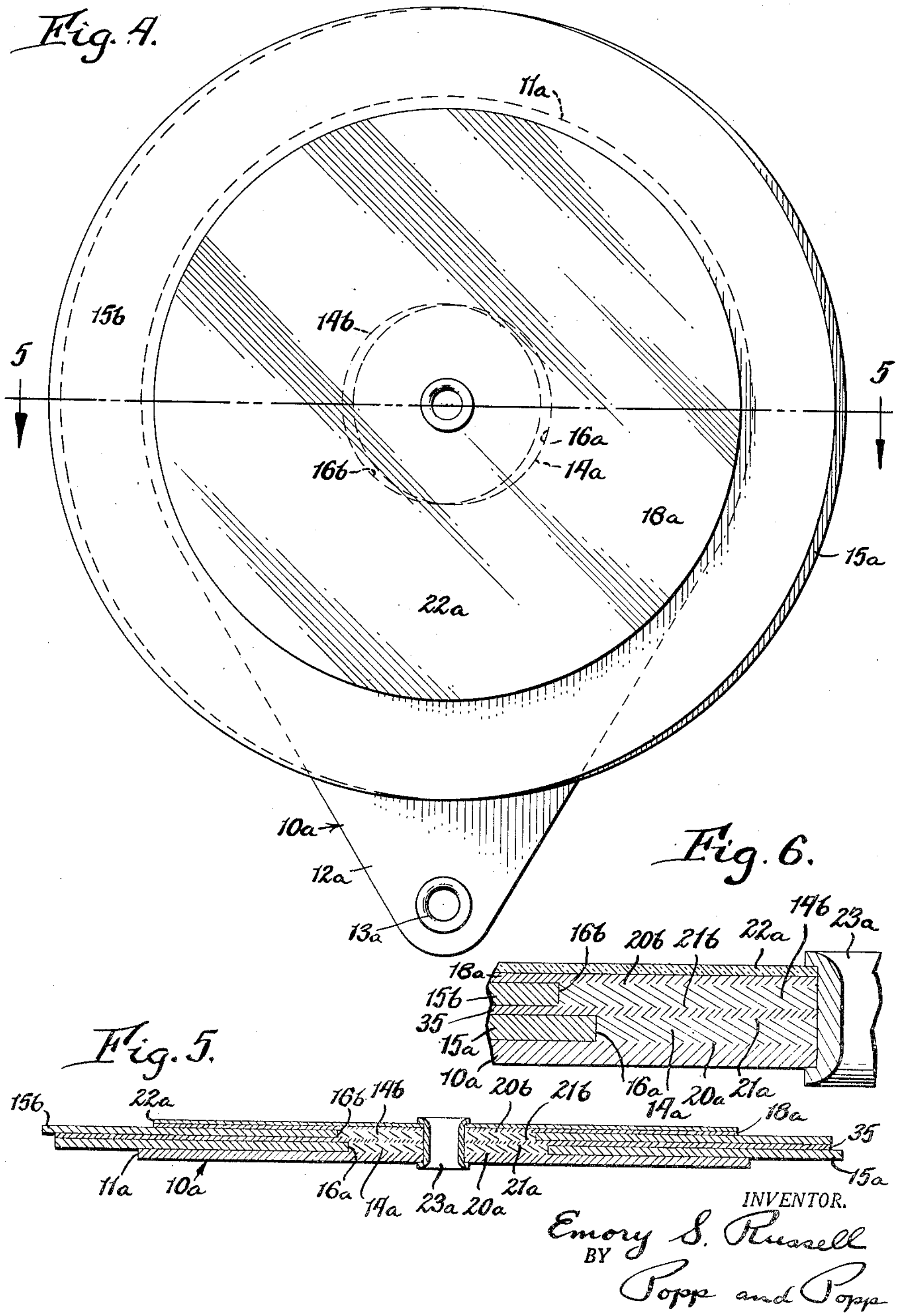
Fig. 4 is a view similar to Fig. 1 and showing a modified form of the invention in which a multiplicity of rotary sheets are provided and in which the rotary sheets are arranged in eccentric relation to each other to facilitate their manipulation.
Fig. 5 is a sectional view taken on line 4—4, Fig. 3, the thickness of the stationary sheets, spacers and rotary sheets being exaggerated for clarity.
Fig. 6 is a fragmentary view similar to Fig. 5, on an enlarged scale.

It will be apparent that the invention can be embodied in disk slide rules having an increased number of rotary sheets and also that it is not necessary that all of the rotary sheets be in concentric relation with one another. Thus, in the form of the invention shown in Figs. 4–6, the numeral 10*a* represents a flat cardboard body sheet of the general form as the body sheet 10 of the form of the invention shown in Figs. 1 and 2, the same reference numerals being therefore applied. A circular spacer 14*a* of relatively small diameter is arranged against a part of the forward face of the body sheet 10*a*, and against the forward face of this circular spacer 14*a* is arranged a second sheet or disk 35. It will be seen that the body sheet 10*a*, spacer 14*a* and second sheet or disk 35 form a rear sheet member equivalent to the body or rear sheet member 10 in the form of the invention shown in Figs. 1–3. A second circular spacer 14*b* is arranged against the forward face of the second sheet or disk 35 and a third sheet or disk 18*a* is arranged against the forward face of this second circular spacer 14*b*. A circular rotary sheet or disk 15*a* with an enlarged concentric opening 16*a* forming a bearing surface is journalled on the periphery of the circular spacer 14*a*, and a second circular rotary sheet or disk 15*b* having the same diameter as the rotary sheet 15*a* and having an enlarged concentric opening 16*b* is journalled on the periphery of the circular spacer 14*b*. The circular spacers 14*a*, 14*b* are shown as arranged in eccentric relation to each other and 180° out of phase.

As with the form of the invention shown in Figs. 1–3, a rotary sheet or disk 22*a* is fitted against the forward face of the third sheet or disk 18*a* and this third rotary sheet is rotatably retained by the forward head of an eyelet or grommet 23a which extends successively through the third or front rotary sheet 22a, the second sheet or disk 18a, the second circular spacer 14b, the second sheet 35, the first circular spacer 14a and the body sheet 10a. As with the form of the invention shown in Figs. 1–3, each of the circular spacers 14a and 14b has its front and rear face adhesively secured to the corresponding sheet of the indicator, this being effected by glue, staples, or by the weldments, 20a, 21a, 20b and 21b shown.

With the disk slide rule constructed as above, it will be seen that the parts 10a, 14a, 35, 14b and 18a are held in fixed relation with one another by the weldments 20a, 21a, 20b and 21b. It will therefore be seen that any one of the rotary sheets 15a, 15b or 22a can be rotated independently of one another and that the rotation of any one of these rotary sheets does not affect or move with the other rotary sheets. Further, it will be seen that by arranging the rotary sheets 15a and 15b eccentrically and 180° out of phase with each other, the rotary sheet 15a can readily be turned by grasping the right-hand edge thereof as viewed in Fig. 4, and that, similarly, the rotary sheet 15b can readily be turned by grasping the left-hand edge thereof as viewed in Fig. 4. Since the present invention relates essentially to the construction of the rotary indicator rather than to any particular use, no scales or pointers have been applied to the form of the invention shown in Figs. 4–6.

From the foregoing it will be seen that the present invention provides an extremely simple and low-cost disk slide rule which can be made principally of cardboard and which will stand up under conditions of severe and constant use without losing register of the parts; in which the movement of one rotary sheet will not influence or change the setting of another rotary sheet; which can have one or more circular rotary sheets arranged coaxially, or not, as desired; and which can be put to a wide variety of uses.

I claim:

1. A disk slide rule, comprising a rear sheet member, a circuluar spacer of relatively small diameter arranged against a part of the forward face of said rear sheet member, a second sheet member of larger area than said circular spacer arranged against the forward face of said circular spacer, a rotary sheet member of substantially the same thickness as said circular spacer and having a circular opening forming a bearing surface journalled on the periphery of said circular spacer and interposed between the forward face of said rear sheet member and the rearward face of said second sheet member, means securing said rear sheet member, second sheet member and circular spacer in fixed relation to one another, a second rotary sheet member arranged against the forward face of said second sheet member and forming the central face of the indicator, and a fastener extending through said rear sheet member, circular spacer, second sheet member and second rotary sheet member and having enlarged end heads engaging, respectively, the rearward face of said rear sheet member and the forward face of said second rotary sheet member and a reduced shank on which said second rotary sheet member is directly journalled.

2. A disk slide rule, comprising a rear sheet member, a circular spacer of relatively small diameter arranged against a part of the forward face of said rear sheet member, a second sheet member of larger area than said circular spacer arranged against the forward face of said circular spacer, a circular rotary sheet member of substantially the same thickness as said circular spacer and having a concentric circular opening forming a bearing surface journalled on the periphery of said circular spacer and interposed between the forward face of said rear sheet member and the rearward face of said second sheet member, means securing said rear sheet member, a second sheet member and circular spacer in fixed relation to one another, a fastener secured to project forwardly from the forward face of said second sheet member in eccentric relation to the axis of rotation of said circular sheet member, and a second circular sheet member arranged against the forward face of said second sheet member in concentric relation to said fastener and journalled thereon.

3. A disk slide rule comprising a rear sheet member of cardboard, a circular spacer of relatively small diameter arranged against a part of the forward face of said rear sheet member, a second sheet member of cardboard of larger area than said circular spacer arranged against the forward face of said circular spacer, a circular rotary cardboard sheet member of substantially the same thickness as said circular spacer and having a concentric circular opening forming a bearing surface journalled on the periphery of said circular spacer and interposed between the forward face of said rear sheet member and the rearward face of said second sheet member, means securing said rear sheet member, second sheet member and circular spacer in fixed relation to one another, a second circular rotary sheet member arranged against the forward face of said second sheet member and a fastener extending through said rear sheet member, circular spacer, second sheet member and second rotary sheet member in eccentric relation to said circular spacer and having enlarged end heads and a reduced shank on which said second circular sheet member is journalled.

4. A disk slide rule, comprising a rear sheet member, a circular spacer of relatively small diameter arranged against a part of the forward face of said rear sheet member, a second sheet member of larger diameter than said circular spacer arranged against the forward face of said circular spacer, a circular rotary sheet member of substantially the same thickness as said circular spacer and having a concentric circular opening forming a bearing surface journalled on the periphery of said circular spacer and interposed between the forward face of said rear sheet member and the rearward face of said second sheet member, a second circular spacer of relatively small diameter arranged against a part of said second sheet member, a third sheet member of larger area than said second circular spacer arranged against the forward face of said second circular spacer, a second circular rotary sheet member of substantially the same thickness as said second circular spacer and having a concentric circular opening forming a bearing surface journalled on the periphery of said second circular spacer and interposed between the forward face of said second sheet member and the rearward face of said third sheet member, and means securing said rear sheet member, first circular spacer, second sheet member, second circular spacer and third sheet member in fixed relation to one another and with said circular spacers in eccentric relation to each other.

5. A disk slide rule, comprising a rear sheet member, a circular spacer of relatively small diameter arranged against a part of the forward face of said rear sheet member, a second sheet member of larger area than said circular spacer arranged against the forward face of said circular spacer and provided with a circular scale concentric therewith, a rotary sheet member of substantially the same thickness as said circular spacer and having a circular opening forming a bearing surface journalled on the periphery of said circular spacer and interposed between the forward face of said rear sheet member and the rearward face of said second sheet member, means securing said rear sheet member, second sheet member and circular spacer in fixed relation to one another, a second rotary sheet member made of transparent material arranged against the forward face of said second sheet member and forming the central face of the indicator and through which the face of said second sheet member is visible, and a fastener extending through said rear sheet member, circular spacer, second sheet member and second rotary sheet member and having enlarged end heads engaging, respectively the rearward face of said rear sheet member and the forward face of said second rotary sheet member and also having a reduced shank on which said second sheet member is directly journalled.

EMORY S. RUSSELL.

REFERENCES CITED

The following references are of record in the file of this patent:

UNITED STATES PATENTS

| Number | Name | Date |
|---|---|---|
| 974,354 | Brown | Nov. 1, 1910 |
| 1,076,929 | Williamson | Oct. 28, 1913 |
| 1,536,693 | Schneider | May 5, 1925 |

FOREIGN PATENTS

| Number | Country | Date |
|---|---|---|
| 44,632 | Germany | Sept. 13, 1888 |